(12) United States Patent
Park et al.

(10) Patent No.: US 10,698,255 B2
(45) Date of Patent: Jun. 30, 2020

(54) PHOTOLUMINESCENCE DEVICE, METHOD OF MANUFACTURING THE SAME AND DISPLAY APPARATUS HAVING THE SAME

(71) Applicant: SAMSUNG DISPLAY CO., LTD., Yongin-si, Gyeonggi-do (KR)

(72) Inventors: Kisoo Park, Hwaseong-si (KR); Youngmin Kim, Asan-si (KR); Haeil Park, Seoul (KR); Seon-Tae Yoon, Seoul (KR)

(73) Assignee: Samsung Display Co., Ltd. (KR)

( * ) Notice: Subject to any disclaimer, the term of this patent is extended or adjusted under 35 U.S.C. 154(b) by 202 days.

(21) Appl. No.: 15/857,982

(22) Filed: Dec. 29, 2017

(65) Prior Publication Data

US 2018/0275461 A1  Sep. 27, 2018

(30) Foreign Application Priority Data

Mar. 21, 2017 (KR) .................. 10-2017-0035592

(51) Int. Cl.
*G02F 1/1335* (2006.01)
*G02F 1/13357* (2006.01)

(52) U.S. Cl.
CPC .... *G02F 1/133602* (2013.01); *G02F 1/13362* (2013.01); *G02F 1/133512* (2013.01); *G02F 1/133514* (2013.01); *G02F 1/133617* (2013.01); *G02F 1/133621* (2013.01); *G02F 2001/133614* (2013.01)

(58) Field of Classification Search
None
See application file for complete search history.

(56) References Cited

U.S. PATENT DOCUMENTS

| 8,421,983 | B2* | 4/2013 | Jung ............... G02F 1/1339 349/153 |
| 2016/0042703 | A1* | 2/2016 | Fan ................ G09G 3/3607 345/88 |
| 2017/0076678 | A1* | 3/2017 | Lee ............... G02F 1/133512 |

FOREIGN PATENT DOCUMENTS

| KR | 10-2008-0054352 A | 6/2008 |
| KR | 10-2015-0129551 A | 11/2015 |
| KR | 10-2016-0124977 A | 10/2016 |

* cited by examiner

*Primary Examiner* — Richard H Kim
(74) *Attorney, Agent, or Firm* — Innovation Counsel LLP

(57) ABSTRACT

A photoluminescence device includes a first base substrate, a blue light blocking pattern disposed on the first base substrate in a first color pixel area, a second color pixel area and a first light blocking area disposed between the first color pixel area and the second color pixel area, a blue color filter disposed on the first base substrate in a blue pixel area, the first light blocking area and a second light blocking area between the blue pixel area and the second color pixel area, a first color conversion pattern disposed on the blue light blocking pattern in the first color pixel area, and a second color conversion pattern disposed on the blue light blocking pattern in the second color pixel area.

20 Claims, 17 Drawing Sheets

PHOTOLUMINESCENCE DEVICE, METHOD OF MANUFACTURING THE SAME AND DISPLAY APPARATUS HAVING THE SAME

The present application claims priority to and the benefit of Korean Patent Application No. 10-2017-0035592, filed on Mar. 21, 2017, the disclosure of which is incorporated by reference herein in its entirety.

BACKGROUND

1. Field

Example embodiments of the inventive concept relate to a photoluminescence device, a method of manufacturing the photoluminescence device, and a display apparatus having the photoluminescence device. More particularly, example embodiments of the inventive concept relate to a photoluminescence device using quantum dot, a method of manufacturing the photoluminescence device, and a display apparatus having the photoluminescence device.

2. Description of the Related Art

Recently a display apparatus having light weight and small size has been manufactured. A cathode ray tube (CRT) display apparatus has been used due to its performance and competitive price. However the CRT display apparatus has a weakness with its size or portability. Therefore a display apparatus such as a plasma display apparatus, a liquid crystal display apparatus and an organic light emitting display apparatus has been highly regarded due to its small size, light weight and low-power-consumption.

The display apparatus may further include a photoluminescence device. The photoluminescence device includes a color conversion structure for converting color of light, such as a quantum dot. A desired color can be imparted to the image by the photoluminescence device. Thus, color reproducibility of the image and the luminous efficiency can be improved, so that the display quality can be improved. However, the above-mentioned display apparatus having the photoluminescence device has a problem in that it is complicated in structure, complicated in the manufacturing process, and high in manufacturing cost as the photoluminescence device has to be additionally provided in the display apparatus.

SUMMARY

One or more example embodiment of the inventive concept provides a photoluminescence device having a simple structure and a simple manufacturing process.

One or more example embodiments of the inventive concept also provide a method of manufacturing the photoluminescence device.

One of more example embodiments of the inventive concept also provide a display apparatus having the photoluminescence device.

According to an example embodiment of the inventive concept, a photoluminescence device includes a first base substrate, a blue light blocking pattern disposed on the first base substrate in a first color pixel area, a second color pixel area and a first light blocking area disposed between the first color pixel area and the second color pixel area, a blue color filter disposed on the first base substrate in a blue pixel area, the first light blocking area and a second light blocking area between the blue pixel area and the second color pixel area, a first color conversion pattern disposed on the blue light blocking pattern in the first color pixel area, and a second color conversion pattern disposed on the blue light blocking pattern in the second color pixel area.

In an example embodiment, the blue light blocking pattern may have transmittance at a wavelength of 500 nm (nanometers) is less than 5%, and the blue color filter may have transmittance at a wavelength of 500 nm is less than 5%.

In an example embodiment, the first color conversion pattern may be a green color conversion pattern, and the second color conversion pattern may be a red color conversion pattern, or the first color conversion pattern may be a red color conversion pattern, and the second color conversion pattern may be a green color conversion pattern.

In are example embodiment, the green color conversion pattern may include green quantum dot particles and/or green phosphor. The red color conversion pattern may include red quantum dot particles and/or red phosphor.

In an example embodiment, the photoluminescence device may further include a transflective layer disposed between the first base substrate and the blue light blocking pattern, and between the first base substrate and the blue color filter, and a light recycle filter disposed on the blue color filter, the first color conversion pattern and the second color conversion pattern.

In an example embodiment, the photoluminescence device may further include a planarization layer disposed on the light recycle filter, and a wire grid polarizer disposed on the planarization layer.

In an example embodiment, the photoluminescence device may further include a ¼ wave polarizer disposed on the first base substrate.

In an example embodiment, the photoluminescence device may further include a transparent filter comprising scattering particles and disposed overlapping the blue color filter.

According to an example embodiment of the inventive concept, a display apparatus includes a display area in which an image is displayed and a peripheral area which is non-display area and surrounding the display area. The display apparatus includes a first base substrate, a blue light blocking pattern disposed on the first base substrate in a first color pixel area, a second color pixel area and a first light blocking area disposed between the first color pixel area and the second color pixel area, a blue color filter disposed on the first base substrate in a blue pixel area, the first light blocking area and a second light blocking area between the blue pixel area and the second color pixel area, a first color conversion pattern disposed on the blue light blocking pattern in the first color pixel area, and a second color conversion pattern disposed on the blue light blocking pattern in the second color pixel area, a second base substrate facing the first base substrate, a thin film transistor disposed on the second base substrate, a pixel electrode electrically connected to the thin film transistor, a liquid crystal layer disposed on the pixel electrode, and a backlight unit providing a blue light to the liquid crystal layer and disposed under the second base substrate.

In an example embodiment, the blue light blocking pattern may have transmittance at a wavelength of 500 nm is less than 5%, and the blue color filter may have transmittance at a wavelength of 500 nm is less than 5%.

In an example embodiment, the first color conversion pattern may be a green color conversion pattern, and the second color conversion pattern may be a red color conversion pattern or the first color conversion pattern may be a red color conversion pattern, and the second color conversion pattern may be a green color conversion pattern.

In an example embodiment, the green color conversion pattern may include green quantum dot particles and/or green phosphor. The red color conversion pattern may include red quantum dot particles and/or red phosphor.

In an example embodiment, the display apparatus may further include a transflective layer disposed between the first base substrate and the blue light blocking pattern, and between the first base substrate and the blue color filter, and a light recycle filter disposed on the blue color filter, the first color conversion pattern and the second color conversion pattern.

In an example embodiment, the display apparatus may further include a planarization layer disposed on the light recycle filter, and a wire grid polarizer disposed on the planarization layer.

In an example embodiment, the blue light blocking pattern and the blue color filter may be overlapped with each other in the first light blocking area and the second light blocking area.

In an example embodiment, the display apparatus may further include a sealing member in the peripheral area. The blue light blocking pattern and the blue color filter may be overlapped with each other in the peripheral area.

According to an example embodiment of the inventive concept, a method of manufacturing a photoluminescence device includes forming a blue light blocking pattern on a first base substrate in a first color pixel area, a second color pixel area and a first light blocking area which is between the first color pixel area and the second color pixel area, forming a blur color filter on the first base substrate in a blue pixel area, the first light blocking area and a second light blocking area which is between the blue pixel area and the second color pixel, forming a first color conversion pattern on the blue light blocking pattern in the first color pixel area, and forming a second color conversion pattern on the blue light blocking pattern in the second color pixel area.

In an example embodiment, the blue light blocking pattern may have transmittance at a wavelength of 500 nm is less than 5%, and the blue color filter may have transmittance at a wavelength of 500 nm is less than 5%.

In an example embodiment, the method may further include forming a transflective layer on the first base substrate before forming the blue light blocking pattern.

In an example embodiment, the method may further include attaching a ¼ wave polarizer on the first base substrate.

According to example embodiments of the present inventive concept, a photoluminescence device includes a blue color filter and a blue light blocking pattern which are overlapped with each other in a first light blocking area and a second light blocking area. In addition, the photoluminescence device may further include a transflective layer and a ¼ wave polarizer. Accordingly, light blocking function can be realized without forming a additional light blocking member such as a black matrix by the blue color filter, the blue light blocking pattern, the transflective layer, and the quarter wave polarizing plate. Accordingly, structure of a display apparatus including the photoluminescence device can be simplified and manufacturing process can be simplified.

In addition, the display apparatus can implement a light blocking function even when the blue color filter and the blue light blocking pattern are overlapped with each other in a peripheral area without an additional light blocking member such as a black matrix. In addition, it is possible to minimize defects in the process of forming the liquid crystal layer according to a step formed between the display area and the peripheral area.

It is to be understood that both the foregoing general description and the following detailed description are exemplary and explanatory and are intended to provide further explanation of the invention as claimed

BRIEF DESCRIPTION OF THE DRAWINGS

The above and other features of the inventive concept will become more apparent by describing in detail example embodiments thereof with reference to the accompanying drawings, in which.

DETAILED DESCRIPTION

Hereinafter, the inventive concept will be explained in detail with reference to the accompanying drawings.

Figure 1:
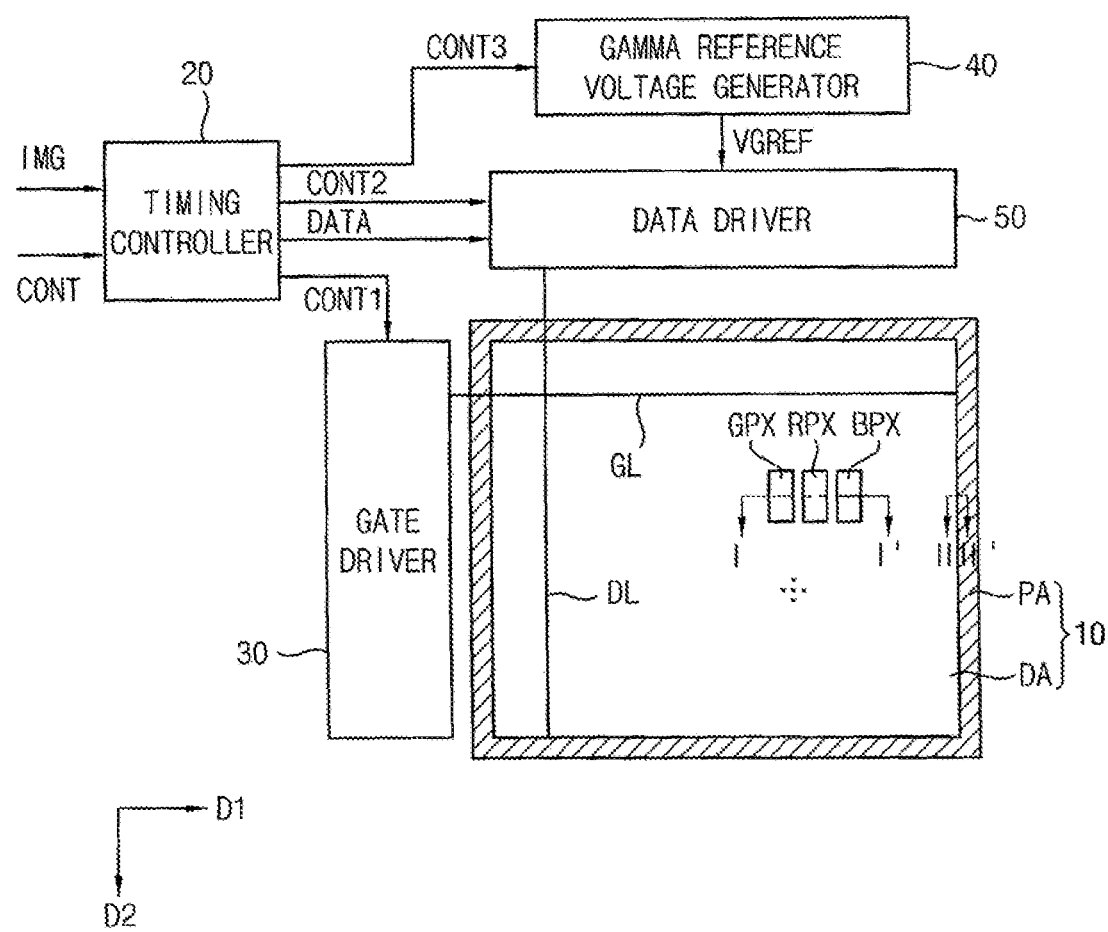
FIG. 1 is a block diagram illustrating a display apparatus according to an example embodiment of the inventive concept.

FIG. 1 is a block diagram illustrating a display apparatus according to an example embodiment of the inventive concept.

Referring to FIG. 1, the display apparatus may include a display panel 10 and a display panel driver. The display panel driver may include a timing controller 20, a gate driver 30, a gamma reference voltage generator 40 and a data driver 50. The display apparatus may further include a backlight unit (refer to BLU of FIG. 2).

The display panel 100 may include a plurality of gate lines GL, a plurality of data lines DL and a plurality of pixels electrically connected to the gate lines GL and the data lines DL. The gate lines GL may extend in a first direction D1, and the data lines DL may extend in a second direction D2 crossing the first direction D1.

Each pixel may include a switching element, a liquid crystal capacitor and a storage capacitor. The liquid crystal capacitor and the storage capacitor are electrically connected to the switching element. The pixels may be disposed in a matrix form.

The display pane 10 may include a first substrate, a second substrate facing the first substrate and a liquid crystal layer disposed between the first substrate and the second substrate. The gate lines, the data lines, pixel electrodes of the pixels and the switching elements may be formed on the first substrate. A common electrode may be formed on the second substrate.

Figure 2:
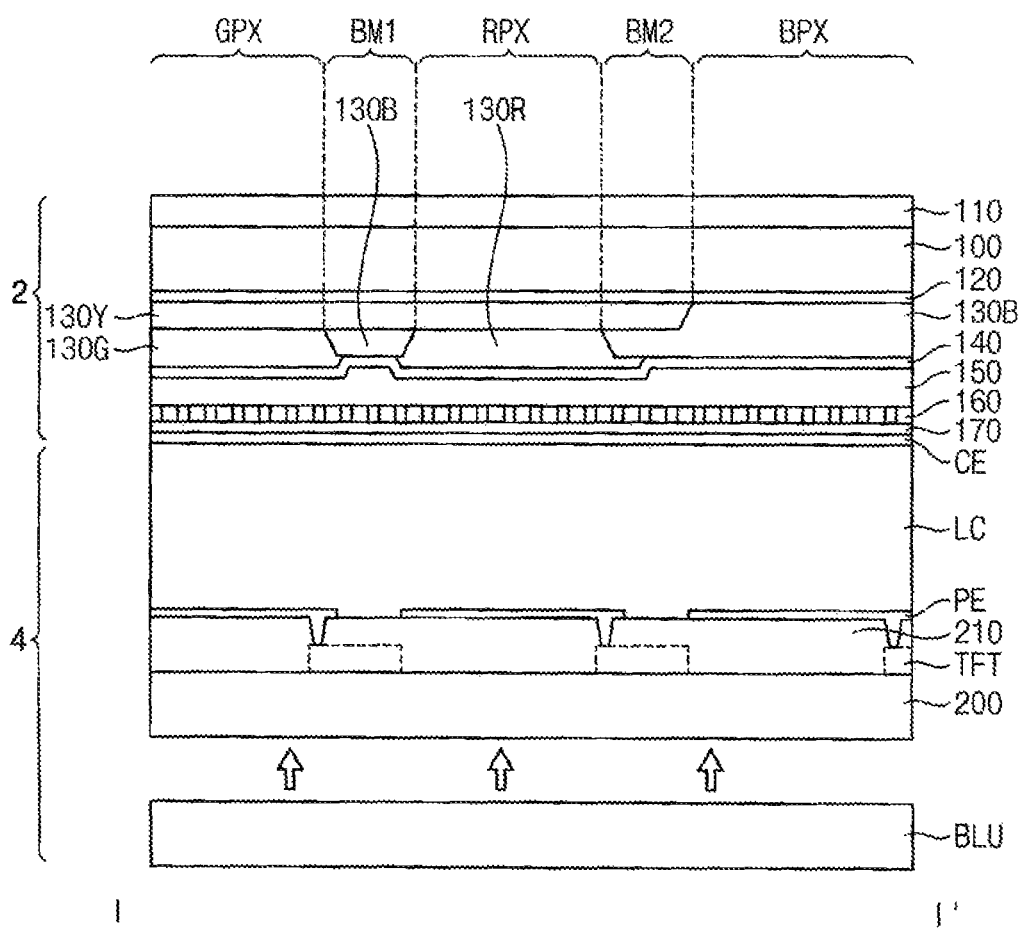
FIG. 2 is a cross-sectional view taken along a line I-I' of FIG. 1.
Figure 3:
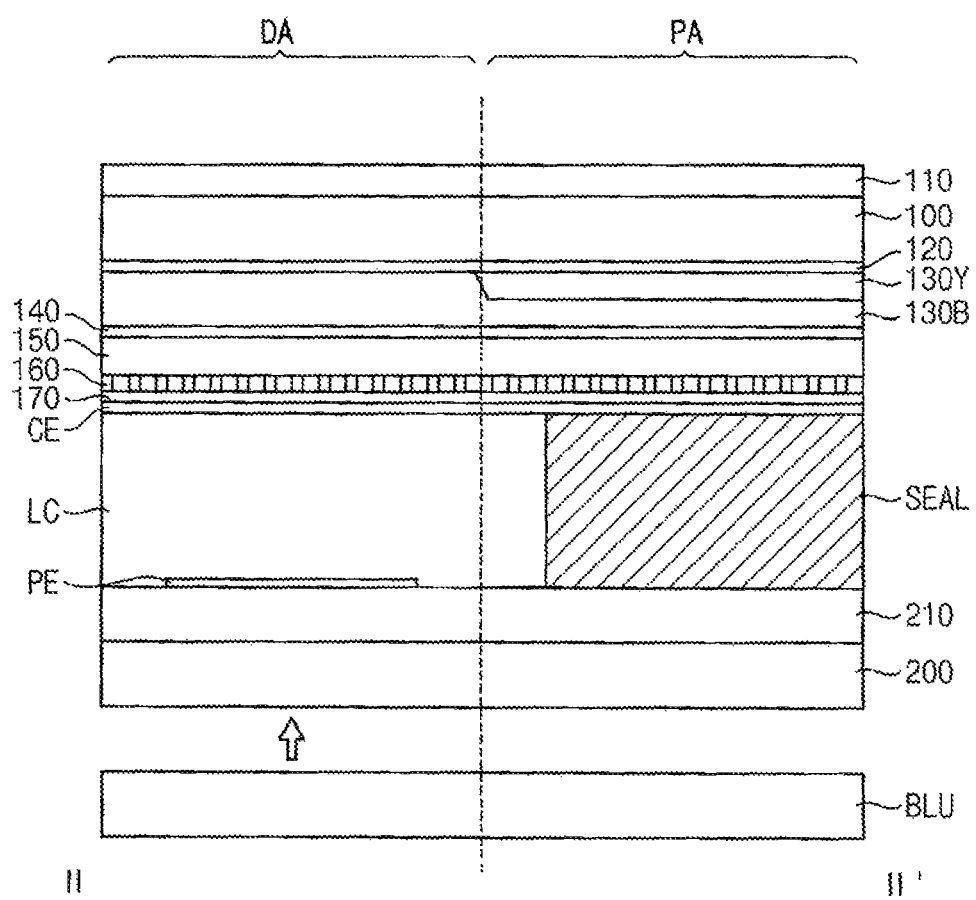
FIG. 3 is a cross-sectional view taken along a line II-II' of FIG. 1.

The structure of the display panel 10 may be explained referring to FIGS. 2 and 3 in detail.

The timing controller 20 may receive input image data IMG and an input control signal CONT from an external apparatus (not shown). The input image data may include red image data, green image data and blue image data. The input control signal CONT may include a master clock signal and a data enable signal. The input control signal CONT may further include a vertical synchronizing signal and a horizontal synchronizing signal.

The timing controller 20 may generate a first control signal CONT1, a second control signal CONT2, a third control signal CONT3 and a data signal DATA based on the input image data IMG and the input control signal CONT.

The timing controller 20 may generate the first control signal CONT1 for controlling an operation of the gate driver 30 based on the input control signal CONT, and outputs the first control signal CONT1 to the gate driver 30. The first control signal CONT1 may further include a vertical start signal and a gate clock signal.

The timing controller 20 may generate the second control signal CONT2 for controlling an operation of the data driver 50 based on the input control signal CONT, and outputs the second control signal CONT2 to the data driver 50. The second control signal CONT2 may include a horizontal start signal and a load signal.

The timing controller 20 may generate the data signal DATA based on the input image data IMG. The timing controller 20 may output the data signal DATA to the data driver 50.

The timing controller 20 may generate the third control signal CONT3 for controlling an operation of the gamma reference voltage generator 40 based on the input control signal CONT, and output the third control signal CONT3 to the gamma reference voltage generator 40.

The gate driver 30 may generate gate signals driving the gate hoes GL in response to the first control signal CONT1 received from the timing controller 20. The gate driver 300 may sequentially output the gate signals to the gate lines GL.

The gamma reference voltage generator 40 may generate a gamma reference voltage VGREF in response to the third control signal CONT3 received from the timing controller 20. The gamma reference voltage generator 40 may provide the gamma reference voltage VGREF to the data driver 50. The gamma reference voltage VGREF may have a value corresponding to a level of the data signal DATA.

In an exemplary embodiment, the gamma reference voltage generator 40 may be disposed in the timing controller 20, or in the data driver 50.

The data driver 50 may receive the second control signal CONT2 and the data signal DATA from the timing controller 20, and receive the gamma reference voltages VGREF from the gamma reference voltage generator 40. The data driver 50 may convert the data signal DATA into data voltages having an analog type using the gamma reference voltages VGREF. The data driver 50 may output the data voltages to the data lines DL.

The display panel 10 of the display apparatus may include a display area DA in which an image is displayed and a peripheral area PA that is a non-display area surrounding the display area DA. In the display device DA, the display apparatus may include a green pixel area GPX for emitting green light, a red pixel area RPX for emitting red light, a blue pixel area BPX for emitting blue light, and light blocking area (see BM1 and BM2 in FIG. 2).

FIG. 2 is a cross-sectional view taken along a line I-I' of FIG. 1.

Referring to FIGS. 1 and 2, the display apparatus may include an image generating device 4, which includes a photoluminescence device 2, which is an upper substrate, a lower substrate and a liquid crystal layer LC in the display area DA.

The display apparatus may include the green pixel area GPX, the red pixel area RPX, the blue pixel area PX, a first light blocking area BM1 and a second light blocking area BM2 in the display area DA. The first light blocking area BM1 may be formed between the green pixel area GPX and the red pixel area RPX. The second light blocking area BM2 may be formed between the red pixel area RPX and the blue pixel area BPX.

The photoluminescence device 2 may include a first base substrate 100, a ¼ wave polarizer 110, a transflective layer 120, a blue light blocking pattern 130Y, a blue color filter 130B, a red color conversion pattern 130R, a green color conversion pattern 130G, a light recycle filler 140, a planarization layer 150, a wire grid polarizer 160, an insulation layer 170, and a common electrode CE.

The first base substrate 100 may include a transparent insulation substrate. For example, the first base substrate 100 may include a glass substrate, a quartz substrate, a transparent resin substrate, etc. Examples of the transparent resin substrate for the first base substrate 100 may include polyimide-based resin, acryl-based resin, polyacrylate-based resin, polycarbonate-based resin, polyether-based resin, sulfonic acid containing resin, polyethyleneterephthalate-based resin, etc.

The ¼ wave polarizer 110 may be disposed on the first base substrate 100. The ¼ wave polarizer 110 reduces reflection due to internal configurations of the display apparatus with respect to external light, and may have a structure having a leaner polarizing plate and a ¼ wave retarder overlapping the leaner polarizing plate. The ¼ wave polarizer 110 may be attached on a surface of the first base substrate 100 opposite to the liquid crystal layer LC with reference to the first base substrate 100.

The transflective layer 120 may be disposed on the first base substrate 100. The transflective layer 120 may partially transmit and partially reflect light passing through it. The transflective layer 120 may include metal. For example, the transflective layer 120 may be formed by coating silver (Ag) on the first base substrate 100 with a thin thickness.

The blue light blocking pattern 130 may be formed in the green pixel area GPX, the first light blocking area BM1, the red pixel area RPX and the second light blocking area BM2 on the transflective layer 120. The blue light blocking pattern 130Y may be formed by alternately laminating at least two layers having different refractive indices. Wavelength band of transmitted light excluding wavelength band of blue light is transmitted through the blue light blocking pattern 130Y, and the wavelength band of blue light is blocked by the blue light blocking pattern 130Y. The blue light that is blocked by the blue light blocking pattern 130Y may be reflected and optically recycled.

The blue color filter 130B may be disposed in the blue pixel area BPX, the first light blocking area BM1 and the second light blocking area BM2 on the transflective layer 120 on which the blue light blocking pattern 130Y is formed. The blue color filter 130B may include scattering particles that change the traveling direction of the blue light without changing the wavelength of the wavelength band of blue light provided by the backlight unit BLU. The scattering particles may be particles of TiO2 or the like, and the size of the scattering particle may be similar to the size of the red quantum dot particle or the green quantum dot particle. In addition, the blue color filter 130B may further include a blue pigment for converting light passing therethrough to blue light.

In addition, the first light blocking area BM1 and the second light blocking area BM2 may overlap the blue light blocking pattern 130Y and the blue color filter 130B. Accordingly, light passing the photoluminescence device 2 may be blocked in the first light blocking area BM1 and the second light blocking area BM2, so that the light blocking function can be implemented by overlapping the blue light blocking pattern 130Y and the blue color filter 130B without an additional light blocking pattern like a black matrix.

Especially, the blue light blocking pattern 130Y and the blue color filter 130B may be appropriately selected to minimize the transmittance where the blue light blocking pattern 130Y and the blue color filter 130B overlap each other. For example, selecting the blue light blocking pattern 130Y and the blue color filter 130B such that the blue light blocking pattern 130Y has transmittance at a wavelength of 500 nm is less than 5%, and the blue color filter 130B has transmittance at a wavelength of 500 nm is less than 5%, transmittance at the whole wavelength band is lowered, so that the overlapped portion functions as a light blocking pattern. Accordingly, an additional light blocking member (such as a black matrix) can be omitted, and the structure of the display apparatus can be simplified.

The red color conversion pattern 130R may be disposed on the blue light blocking pattern 130Y in the red pixel area RPX. The red color conversion pattern 130R may convert blue light provided from the backlight unit BLU to red light. For example, the red color conversion pattern 130R may include a color conversion material, such as red quantum dot particles and/or red phosphor.

The green color conversion pattern 130G may be disposed on the blue light blocking pattern 130Y in the green pixel area GPX. The green color conversion pattern 130G may convert blue light provided from the backlight unit BLU to green light. For example, the green color conversion pattern 130G may include a color conversion material, such as green quantum dot particles and/or green phosphor.

The red or green quantum dot may be a material that has a nano-scaled structure and may include several hundred to several thousand atoms. Since the quantum dot is very small in size, a quantum confinement effect may occur. The quantum confinement effect may indicate that an energy band gap of an object is increased when the object becomes smaller than nano size. When the light having energy higher than that of the band gap is incident to the quantum dot, the quantum dot may absorb the light and may emit a second light having a specific wavelength and an energy level in the ground state. The wavelength of the emitted second light may have a value corresponding to the band gap. When a size and a composition of the quantum dot are adjusted, the emission property of the quantum dot may be controlled by the quantum confinement.

The composition of the quantum dots is not limited to a specific composition, and any suitable composition may be used. For example, the quantum dot may be a quantum dot of Group II-VI elements, Group III-V elements, Group IV elements, of Group IV-VI elements of the periodic table. The Group II elements may be selected from the group consisting of at least one of zinc, cadmium, and mercury. The Group III elements may be selected from the group consisting of at least one of aluminum, gallium, and indium. The Group IV elements may be selected from the group consisting of at least one of silicon, germanium, tin, and lead. The Group V elements may be selected from the group consisting of at least one of nitrogen, phosphorus, and arsenic. The Group VI elements may be selected from the group consisting of at least one of sulfur, selenium, and tellurium.

The light recycle filter 140 may be disposed on the blue color filter 130B, the red color conversion pattern 130R and the green color conversion pattern 130G. The light recycle filter 140 may be a yellow light recycle filter. The light recycle filter 140 may reflect light that is reflected toward the liquid crystal layer LC while the light passes the blue color filter 130B, the red color conversion pattern 130R, the green color conversion pattern 130G, and the blue light blocking pattern 130Y from the backlight unit BLU, so that brightness of the display apparatus may be improved.

The planarization layer 150 may be disposed on the light recycle filter 140. The planarization layer 150 may have a flat upper surface, and may include inorganic or organic insulation material.

The wire grid polarizer 160 may be disposed on the planarization layer 150. The wire grid polarizer 160 may include metal, and include a plurality of fine lines that extend in one direction, are formed of metal and are arranged at regular intervals. The fine lines may have a pitch of about 50 nm (nanometer) to 150 nm. The pitch refers to sum of a width of one fine line and a distance between adjacent fine lines.

The insulation layer 170 may be disposed on the wire gird polarizer 160 for capping the wire gird polarizer 160. The insulation layer 170 may include inorganic or organic insulation material.

The common electrode CE may be disposed on the insulation layer 170. A common voltage may be applied to the common electrode CE. The common electrode CE may include transparent conductive material. For example, the common electrode CE may include indium tin oxide (ITO), indium zinc oxide (IZO), etc.

The image generating device 4 may further include the lower substrate and the liquid crystal layer LC. The lower substrate may include a second substrate 200, a thin film transistor TFT, a TFT insulation layer 210, and a pixel electrode PE.

The second base substrate 200 may be disposed to face the first base substrate 100. The second base substrate 200 may include a transparent insulation substrate. For example, the second base substrate 200 may include a glass substrate, a quartz substrate, a transparent resin substrate, etc. Examples of the transparent resin substrate for the second base substrate 200 may include polyimide-based resin, acryl-based resin, polyacrylate-based resin, polycarbonate-based resin polyether-based sulfonic acid containing resin, polyethyleneterephthalate-based resin, etc.

The thin film transistor TFT may be disposed on the second base substrate 200. The thin film transistor TFT may be electrically connected to a data line (refers to DL of FIG. 1) and a gate line (refers to GL of FIG. 1).

The TFT insulation layer 210 may be disposed on the second base substrate 200 on which the thin film transistor TFT is formed. Although the thin film transistor TFT and the TFT insulating layer 210 are each shown as one configuration in the drawing, they may be composed of a plurality of layers. For example, a gate pattern, a gate insulating layer, an active pattern, a data pattern, a data insulating layer, and the like are sequentially formed on the second base substrate 200 to form the thin film transistor TFT and the TFT insulating layer 210.

The pixel electrode PE may be disposed on the TFT layer 210. The pixel electrode PE may be electrically connected to the thin film transistor TFT through a contact hole formed through the TFT insulation layer 210. The pixel electrode PE may include transparent conductive material. For example, the pixel electrode PE may include indium tin oxide (ITO), indium zinc oxide (IZO), etc.

The liquid crystal layer LC may be disposed between the pixel electrode PE and the common electrode CE. The liquid crystal layer LC may include liquid crystal molecules having optical anisotropy. The liquid crystal molecules are driven by electric field, so that an image is displayed by passing or blocking light through the liquid crystal layer LC.

The backlight unit BLU may be disposed under the second base substrate 200 to provide light to the liquid crystal layer LC. More particularly, the backlight unit BLU may generate blue light in a blue wavelength band to provide the blue light to the liquid crystal layer LC.

Although not shown in the figures, the display apparatus may further include an upper alignment layer disposed between the liquid crystal layer LC and the common electrode CE, a lower alignment layer between the liquid crystal layer LC and the pixel electrode, and a lower polarizer disposed on the second base substrate 200.

Although the image generating device 4 includes the liquid crystal layer in the present embodiment, the image generating device 4 may be a device for generating light for displaying an image in addition to a liquid crystal display device and may be a variety of devices, such as an organic light emitting display, an electrophoretic display, an electrowetting display, and the like, but it is not limited thereto.

FIG. 3 is a cross-sectional view taken along a line II-II' of FIG. 1.

Referring to FIGS. 1 and 3, the display apparatus may include a sealing member SEAL between the lower substrate and the upper substrate, which is the photoluminescence device in the peripheral area PA. The sealing member SEAL may seal a side surface of the liquid crystal layer LC.

Here, a blue light blocking layer pattern 130Y and a blue color filter 130B, which overlaps the blue light blocking layer pattern 130Y, may be disposed in the peripheral area PA. Accordingly, light passing the photoluminescence device 2 may be blocked in the peripheral area PA. Thus, without an additional light blocking pattern, such as a black matrix, the blue light blocking pattern 130Y and the blue color filter 130B overlap each other to prevent light leakage in the peripheral area PA.

In addition, the blue light blocking layer pattern 130Y and the blue color filter 130B are overlapped with each other in the peripheral area PA, so that a difference between the thickness of the upper substrate in the display area DA and the thickness of the upper substrate in the peripheral area PA can be minimized. Accordingly, it is possible to minimize defects in the process of forming the liquid crystal layer LC (liquid dropping process; ODF process) according to a step formed between the display area DA and the peripheral area PA.

Figure 4:
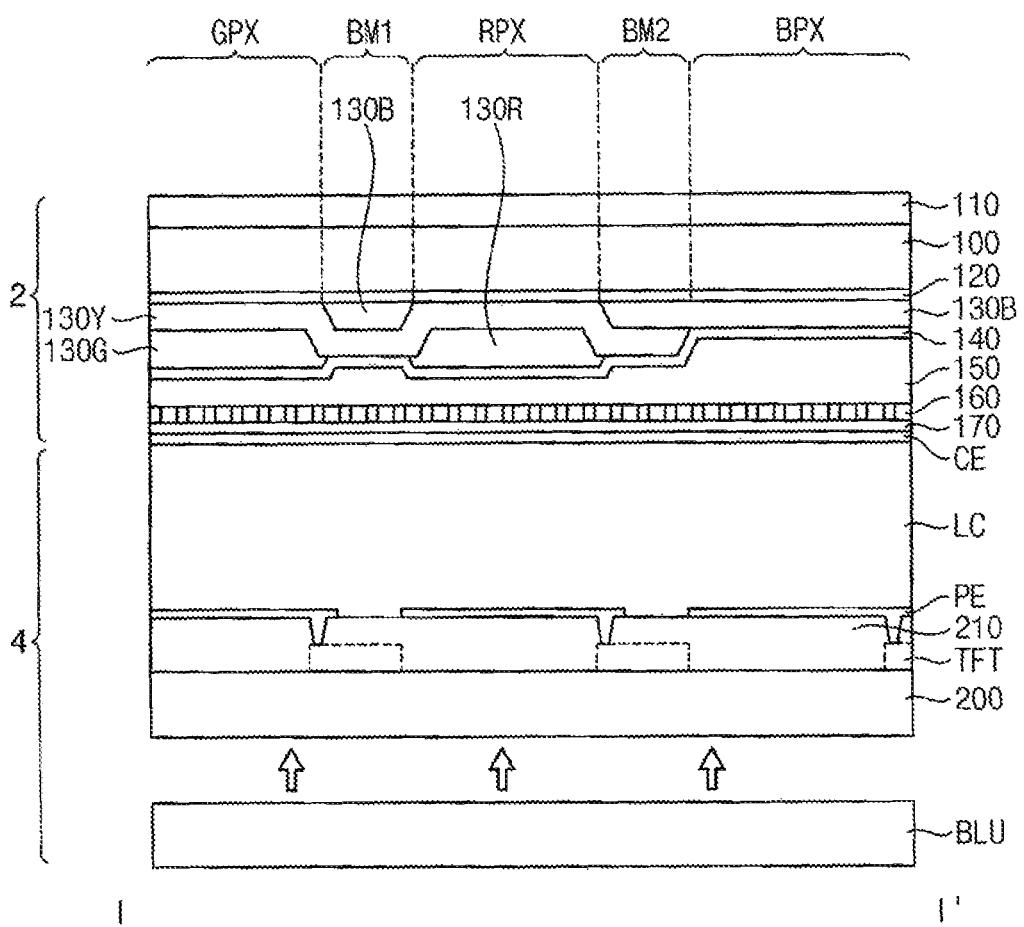
FIG. 4 is a cross-sectional view illustrating a display area of a display apparatus according to an example embodiment of the inventive concept.
Figure 5:
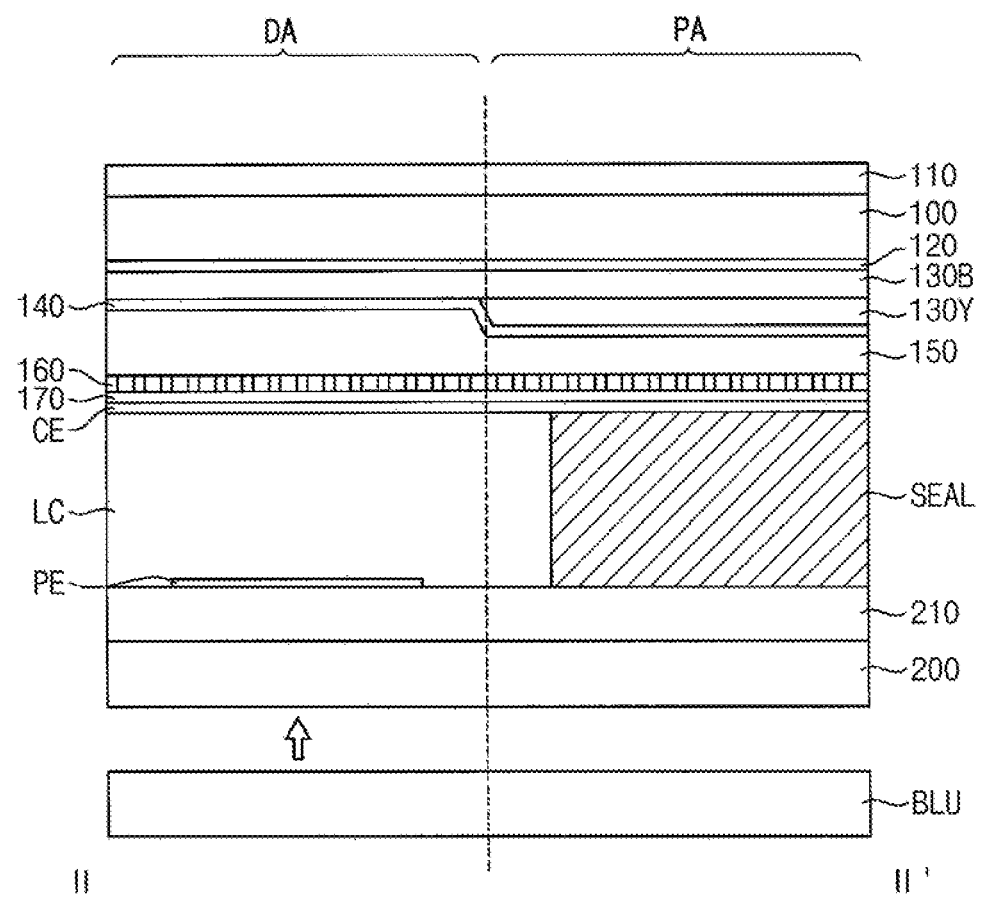
FIG. 5 is a cross-sectional view illustrating a boundary between the display area and a peripheral area of the display apparatus of FIG. 4.

FIG. 4 is a cross-sectional view illustrating a display area of a display apparatus according to an example embodiment of the inventive concept. FIG. 5 is a cross-sectional view illustrating a boundary between the display area and a peripheral area of the display apparatus of FIG. 4.

Referring to FIGS. 4 and 5, the display apparatus may be substantially the same as the display apparatus of FIGS. 2 and 3, except for positions of a blue light blocking pattern 130Y, a blue color filter 130B. Thus, any further detailed descriptions concerning the same elements will be omitted.

The display apparatus may include an image generating device 4, which includes a photoluminescence device 2, which is an upper substrate, a lower substrate and a liquid crystal layer LC.

The display apparatus may include the green pixel area GPX, the red pixel area RPX, the blue pixel area BPX, a first light blocking area BM1 and a second light blocking area BM2 in the display area DA.

The photoluminescence device 2 may include a first base substrate 100, a ¼ wave polarizer 110, a transflective layer 120, a blue light blocking pattern 130Y, a blue color filter 130B, a red color conversion pattern 130R, a green color conversion pattern 130G, a light recycle filter 140, a planarization layer 150, a wire grid polarizer 160, an insulation layer 170, and a common electrode CE.

The ¼ wave polarizer 110 may be disposed on the first base substrate 100. The transflective layer 120 may be disposed on the first base substrate 100.

The blue color filter 130B may be disposed on the transflective layer 120 in the blue pixel area BPX, the first light blocking area BM1 and the second light blocking area BM2.

The blue light blocking pattern 130Y may be formed on the transflective layer 120 on which the blue color filter 130B is formed in the green pixel area GPX, the first light blocking area BM1, the red pixel area RPX and the second light blocking area BM2.

Accordingly, the blue color filter 130B and the blue light blocking pattern 130Y are overlapped with each other in the first light blocking area BM1 and the second light blocking area BM2. Accordingly, light passing the photoluminescence device 2 may be blocked in the first light blocking area BM1 and the second light blocking area BM2, so that the light blocking function can be implemented by overlapping the blue light blocking pattern 130Y and the blue color filter 130B without an additional light blocking pattern like a black matrix.

The red color conversion pattern 130R may be disposed on the blue light blocking pattern 130Y in the red pixel area RPX. The green color conversion pattern 130G may be disposed on the blue light blocking pattern 130Y in the green pixel area GPX. The light recycle filter 140 may be disposed on the blue color filter 130B, the red color conversion pattern 130R and the green color conversion pattern 130G. The planarization layer 150 may be disposed on the light recycle filter 140. The wire and polarizer 160 may be disposed on the planarization layer 150. The insulation layer 170 may be disposed on the wire gird polarizer 160. The common electrode CE may be disposed on the insulation layer 170.

The image generating device 4 may further include the lower substrate and the liquid crystal layer LC. The lower substrate may include a second substrate 200, a thin film transistor TFT, a TFT insulation layer 210, and a pixel electrode PE. The liquid crystal layer LC may be disposed between the pixel electrode PE and the common electrode CE. The backlight unit BLU may be disposed under the second base substrate 200 to provide light to the liquid crystal layer LC. More particularly, the backlight unit BLU may generate blue light in a blue wavelength band to provide the blue light to the liquid crystal layer LC.

The display apparatus may include a sealing member SEAL between the lower substrate and the upper substrate, which is the photoluminescence device, in the peripheral area PA. The sealing member SEAL may seal a side surface of the liquid crystal layer LC. Here, a blue light blocking layer pattern 130Y and a blue color filter 130B, which overlaps the blue light blocking layer pattern 130Y, may be disposed in the peripheral area PA.

Figure 6:
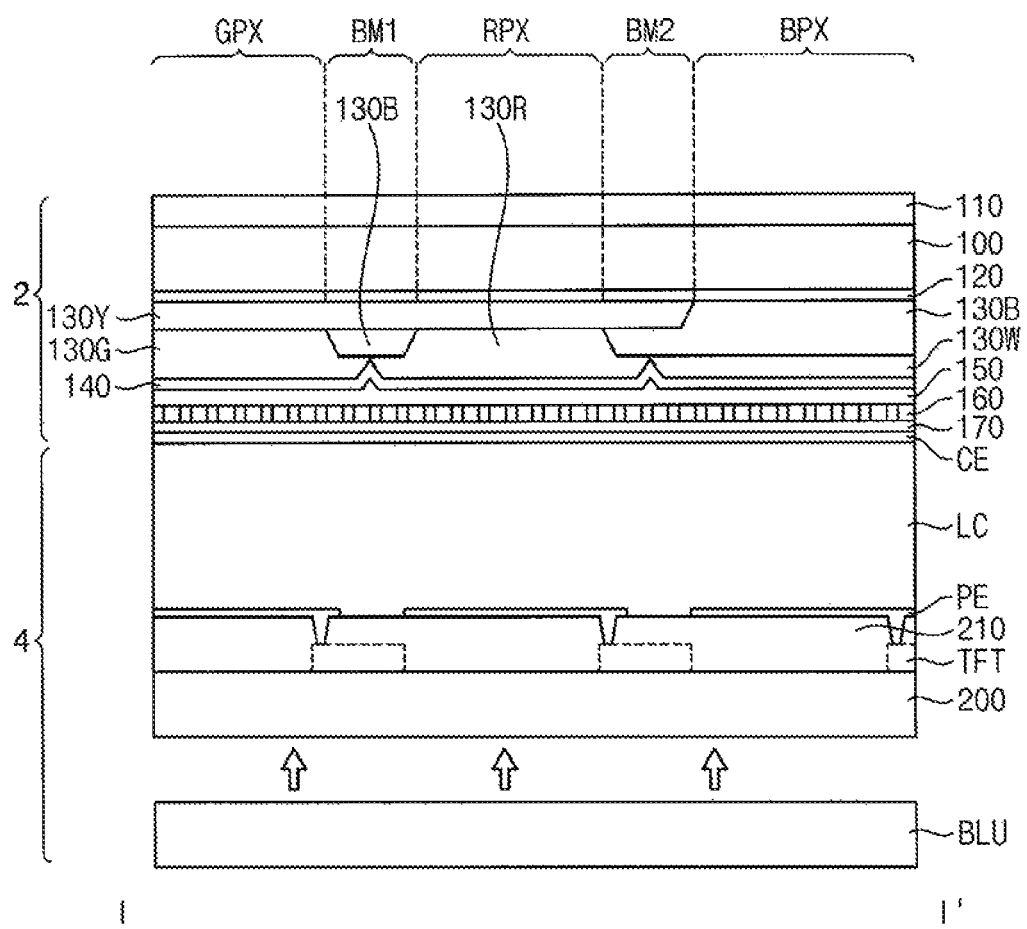
FIG. 6 is a cross-sectional view illustrating a display area of a display apparatus according to an example embodiment of the inventive concept.
Figure 7:
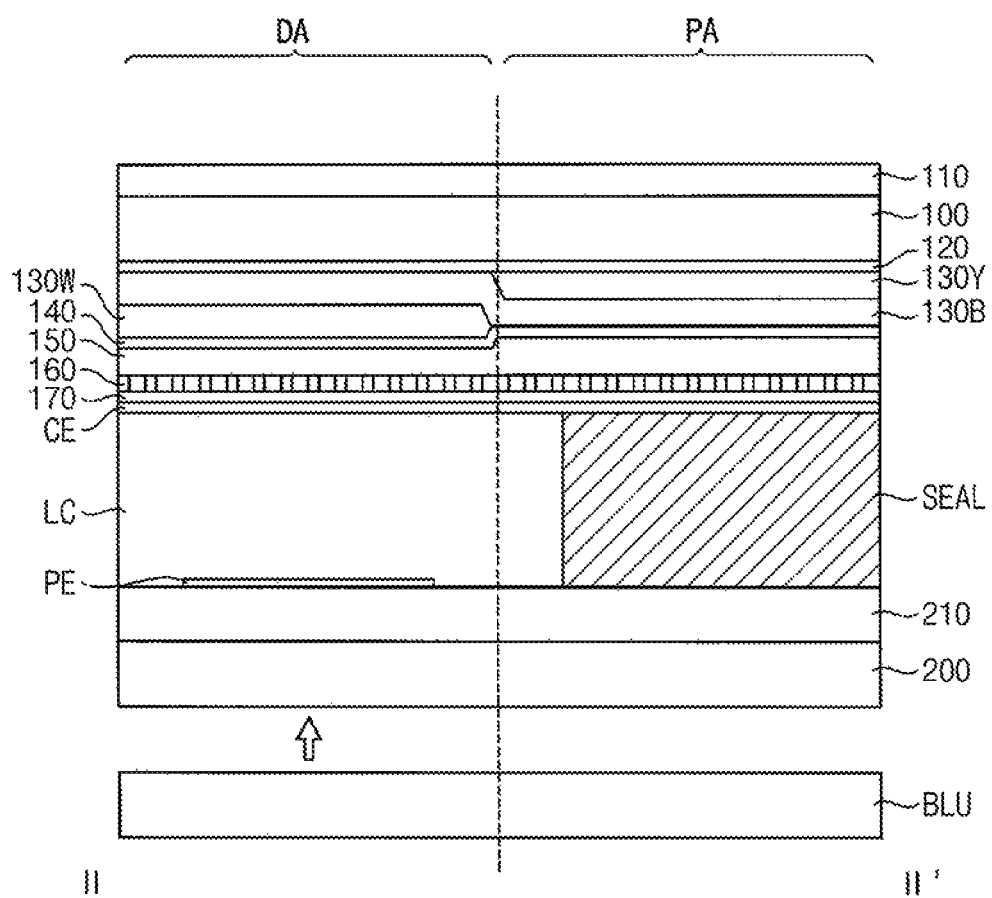
FIG. 7 is a cross-sectional view illustrating a boundary between the display area and a peripheral area of the display apparatus of FIG. 6.

FIG. 6 is a cross-sectional view illustrating a display area of a display apparatus according to an example embodiment of the inventive concept. FIG. 7 is a cross-sectional view illustrating a boundary between the display area and a peripheral area of the display apparatus of FIG. 6.

Referring to FIGS. 6 and 7, the display apparatus may be substantially the same as the display apparatus of FIGS. 2 and 3 except that the display apparatus further includes a transparent filter 130W. Thus, any further detailed descriptions concerning the same elements will be omitted.

The display apparatus may include an image generating device 4, which includes a photoluminescence device 2, which is an upper substrate, a lower substrate and a liquid crystal layer LC in the display area DA.

The display apparatus may include the green pixel area GPX, the red pixel area RPX, the blue pixel area BPX, a first light blocking area BM1 and a second light blocking area BM2 in the display area DA.

The photoluminescence device 2 may include a first base substrate 100, a ¼ wave polarizer 110, a transflective layer 120, a blue light blocking pattern 130Y, a blue color filter 130B, a transparent filter 130W, a red color conversion pattern 130R, a green color conversion pattern 130G, a light recycle filter 140, a planarization layer 150, a wire grid polarizer 160, an insulation layer 170, and a common electrode CE.

The transparent filter 130W may include scattering particles that change the traveling direction of light. The scattering particles may be particles of TiO2 or the like. Here, the blue color filter 130B may include blue pigment for converting light passing therethrough to blue light, and may not include additional scattering particles.

The display apparatus may include a sealing member SEAL between the lower substrate and the upper substrate, which is the photoluminescence device, in the peripheral area PA.

In the above embodiments, the display apparatus has a green pixel area GPX for emitting green light, a red pixel area RPX for emitting red light, and a blue pixel area BPX for emitting blue light. However, the display apparatus may have pixels arrangement of any other known color combinations.

FIGS. 8A to 8H are cross-sectional views illustrating a method of manufacturing a photoluminescence device, which is an upper substrate of the display apparatus of FIG. 2.

Figure 8A:
FIGS. 8A, 8B, 8C, 8D, 8E, 8F, 8G and 8H are cross-sectional views illustrating a method of manufacturing a photoluminescence device that is an upper substrate of the display apparatus of FIG. 2.

Referring to FIG. 8A, a transflective layer 120 may be formed on a first base substrate 100. The transflective layer 120 may be a metal layer including silver (Ag), and may be formed by printing process, sputtering process, chemical vapor deposition process, pulsed laser deposition (PLD) process, vacuum deposition process, atomic layer deposition (ALD) process, etc.

Figure 8B:
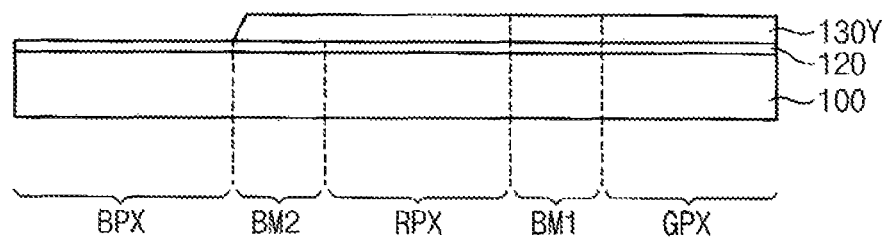

Referring to FIG. 8B, a blue light blocking pattern 130Y may be formed on the transflective layer 120. The blue light blocking pattern 130Y may be formed in the green pixel area GPX, the first light blocking area BM1, the red pixel area RPX, and the second light blocking area BM2. The blue light blocking pattern 130Y may be formed by alternately laminating at least two layers having different refractive indices. The blue light blocking pattern 130Y may be formed by coating a photoresist material containing a material blocking blue light, and exposing and developing the photoresist material.

Figure 8C:
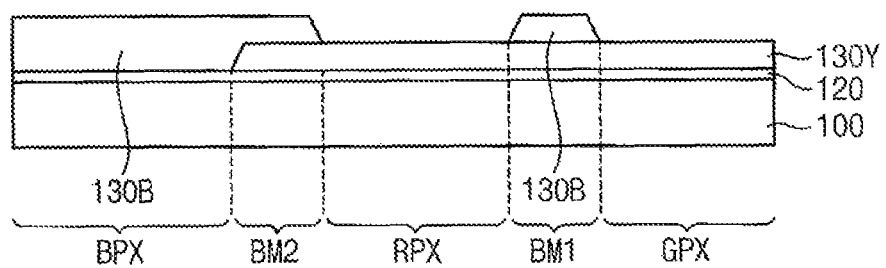

Referring to FIG. 8C, a blue color filter 130B may be formed on the transflective layer 120 on which the blue light blocking pattern 130Y is formed. The blue color filter 130B may be formed in the blue pixel area BPX, the first light blocking area BM1 and the second light blocking area BM2. The blue color filter 130B may be formed by coating a photoresist material containing scattering particles and/or blue pigment on the transflective layer 120, and exposing and developing the photoresist material.

Figure 8D:
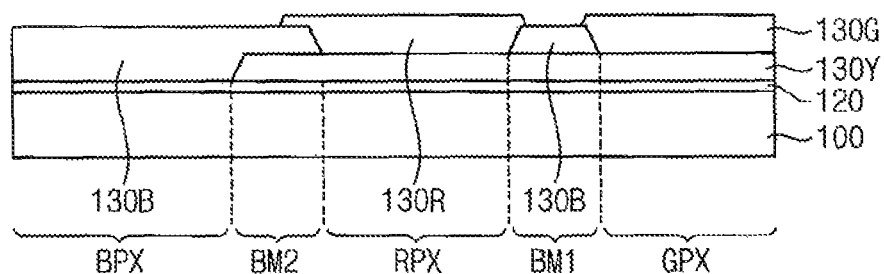

Referring to FIG. 8D, a red color conversion pattern 130R and a green color conversion pattern 130G may be formed on the blue light blocking pattern 130Y on which the blue color filter 130B is formed. The red color conversion pattern 130R may be formed in the red pixel a RPX. The green color conversion pattern 130G may be formed in the green pixel area GPX.

The red color conversion pattern 130R may be formed by coating a photoresist material containing red quantum dot particles and/or red phosphor on the blue light blocking pattern 130Y, exposing and developing the photoresist material. The green color conversion pattern 130G may be formed by coating a photoresist material containing green quantum dot particles and/or green phosphor on the blue light blocking pattern 130Y, exposing and developing the photoresist material. In some example embodiment, the blue light blocking pattern 130Y, the blue color filter 130B, the red color conversion pattern 130R and the green color conversion pattern 130G may be formed by inkjet printing method.

Figure 8E:
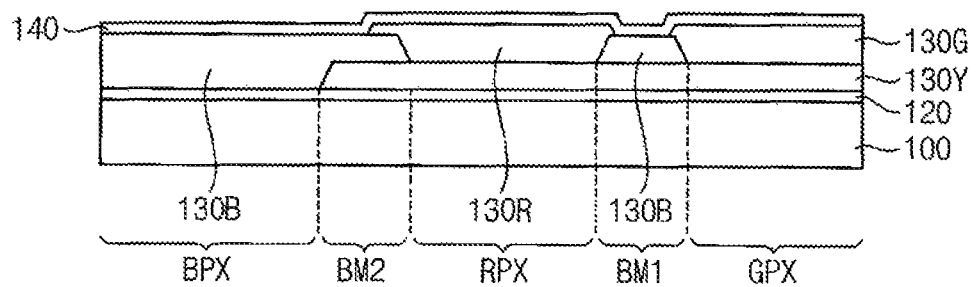

Referring to FIG. 8E, a light recycle filter 140 may be formed on the blue color filter 130B, the red color conversion pattern 130R and the green color conversion pattern 130G.

Figure 8F:
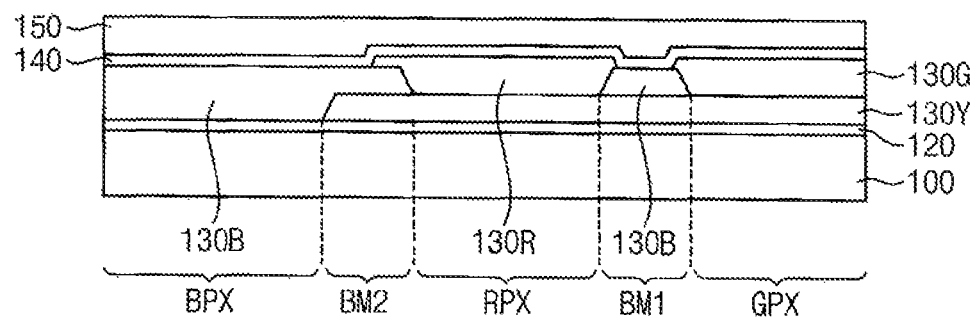

Referring to FIG. 8F, a planarization layer 150 may be formed on the light recycle filter 140. The planarization layer 150 may be obtained by a spin coating process, a chemical vapor deposition process, a plasma enhanced chemical vapor deposition process, a high density plasma-chemical vapor deposition process, and etc. according to constituent material of the planarization layer 150.

Figure 8G:
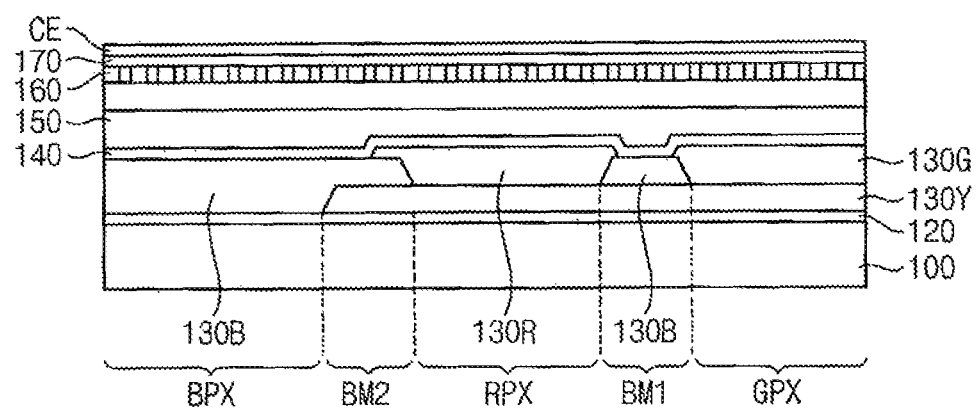

Referring to FIG. 8G, a wire grid polarizer 160, an insulation layer 170, and a common electrode CE may be sequentially formed. The wire grid polarizer 160 may be formed by forming a metal layer on the planarization layer 150, and using a nano-imprint lithograph method. The insulation layer 170 may be formed by a spin coating process, a chemical vapor deposition process, a plasma enhanced chemical vapor deposition process, a high density plasma-chemical vapor deposition process, and etc. according to constituent material of the insulation layer 170. The common electrode CE may be formed by printing process, sputtering process, chemical vapor deposition process, pulsed laser deposition (PLD) process, vacuum deposition process, atomic layer deposition (ALD) process, etc.

Figure 8H:
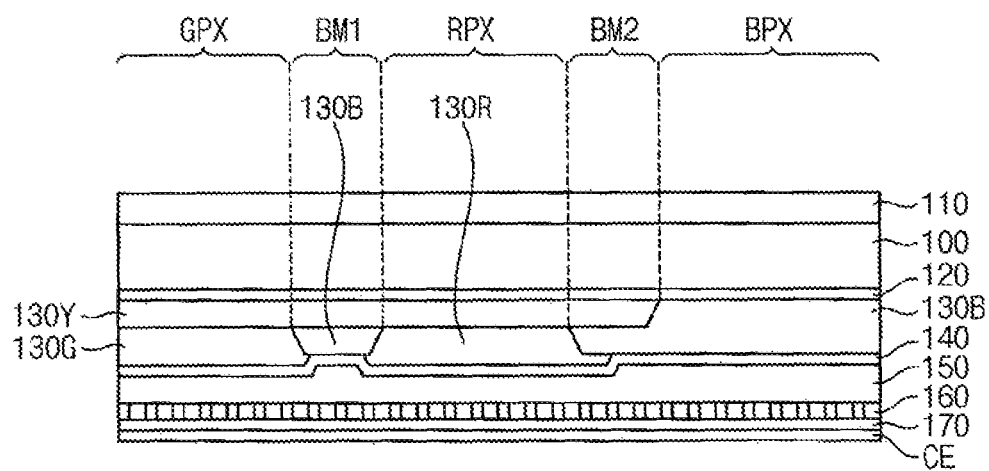

Referring to FIG. 8H, a ¼ wave polarizer 110 may be formed on the first base substrate 100. The ¼ wave polarizer 110 may be an ant-reflection film and may be attached on the first base substrate 100. Accordingly the photoluminescence device, which is an upper substrate of the display apparatus, may be formed. In addition, other configurations of the display apparatus can be manufactured by conventional general methods.

FIGS. 9A to 9E are cross-sectional views illustrating a method of manufacturing a photoluminescence device, which is an upper substrate of the display apparatus of FIG. 4. The method may be substantially same as the method of FIGS. 8A to 8H, except for a formation order of a blue light blocking pattern 130Y and a blue color filter 130B. Thus, any further detailed descriptions concerning the same elements will be omitted.

Figure 9A:
FIGS. 9A, 9B, 9C, 9D and 9E are cross-sectional views illustrating a method of manufacturing a photoluminescence device that is an upper substrate of the display apparatus of FIG. 4.

Referring to FIG. 9A, a transflective layer 120 may be formed on a base substrate 100.

Figure 9B:
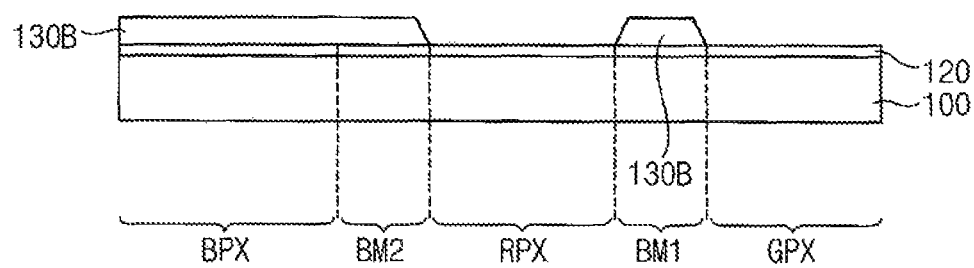

Referring to FIG. 9B, a blue color filter 130B may be formed on the transflective layer 120. The blue color filter 130B may be formed in the blue pixel area BPX, the first light blocking area BM1 and the second light blocking area BM2.

Figure 9C:
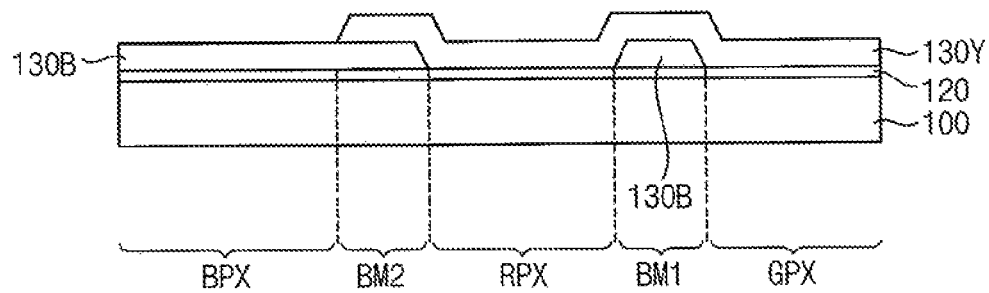

Referring to FIG. 9C, a blue light blocking pattern 130Y may be formed on the transflective layer 120 on which the blue color filter 130B is formed. The blue light blocking pattern 130Y may be formed in the green pixel area GPX, the first light blocking area BM1, the red pixel area RPX and the second light blocking area BM2.

Figure 9D:
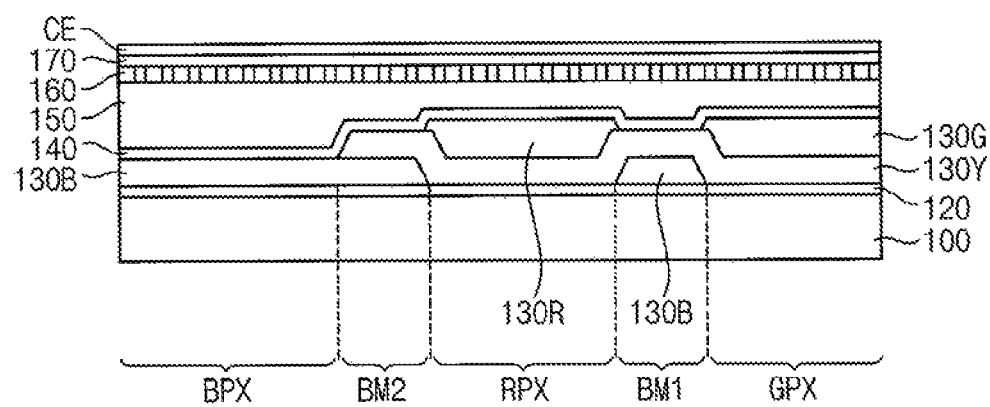

Referring to FIG. 9D, a red color conversion pattern 130R and a green color conversion pattern 130O may be formed on the blue light blocking pattern 130Y. A light recycle filter 140 may be formed on the blue color filter 130B, the red color conversion pattern 130R and the green color conversion pattern 130G. A planarization layer 150 may be formed on the light recycle filter 140. A wire grid polarizer 160, an insulation layer 170, and a common electrode CE may be sequentially formed on the planarization layer 150.

Figure 9E:
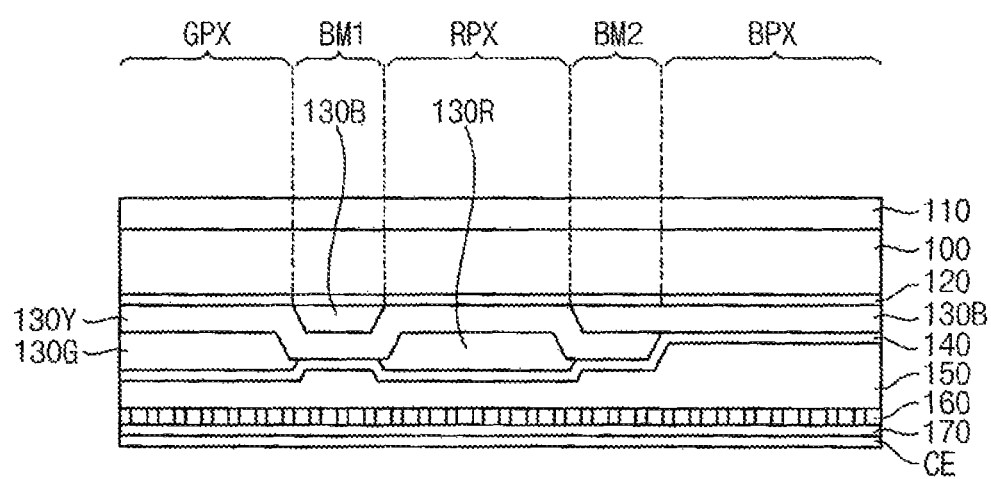

Referring to FIG. 9E, a ¼ wave polarizer 110 may be formed on the first base substrate 100. Accordingly, the photoluminescence device, which is an upper substrate of the display apparatus, may be formed. In addition, other configurations of the display apparatus can be manufactured by conventional general methods.

FIGS. 10A to 10D are cross-sectional views illustrating a method of manufacturing a photoluminescence device, which is an upper substrate of the display apparatus of FIG. 5. The method may be substantially the same as the method of FIGS. 8A to 8H, except that the method further includes forming a transparent filter 130W. Thus, any further detailed descriptions concerning the same elements will be omitted.

Figure 10A:
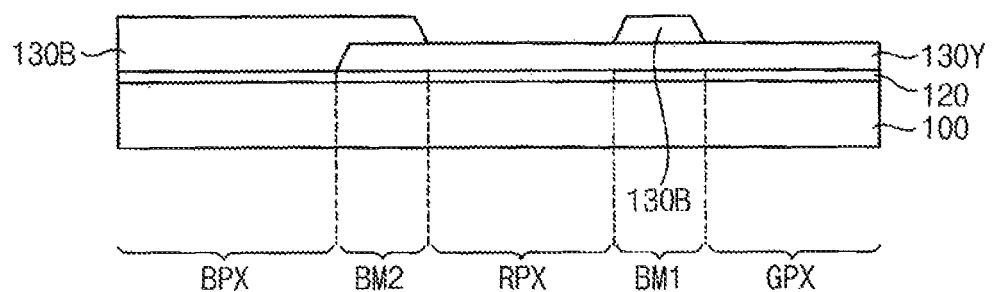
FIGS. 10A, 10B, 10C and 10D are cross-sectional views illustrating a method of manufacturing a photoluminescence device that is an upper substrate of the display apparatus of FIG. 5.

Referring to FIG. 10A, a transflective layer 120 may be formed on a base substrate 100. A blue light blocking pattern 130Y may be formed on the transflective layer 120. A blue color filter 130B may be formed on the transflective layer 120 on which the blue light blocking pattern 130Y is formed.

Figure 10B:
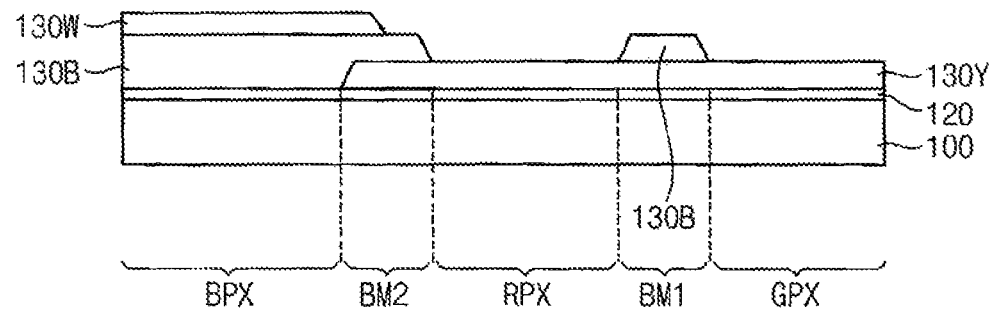

Referring to FIG. 10B, a transparent filter 130W may be further formed on the blue color filter 130B in the blue pixel area BPR. The transparent filter 130W may be formed by coating a photoresist material containing scattering particles, exposing and developing the photoresist material. In some example embodiment, the blue color filter 130B3 and the transparent filter 130W may be formed by being simultaneously exposed and developed. Here, the transparent color filter 130W may also be formed in the first light blocking area BM1.

Figure 10C:
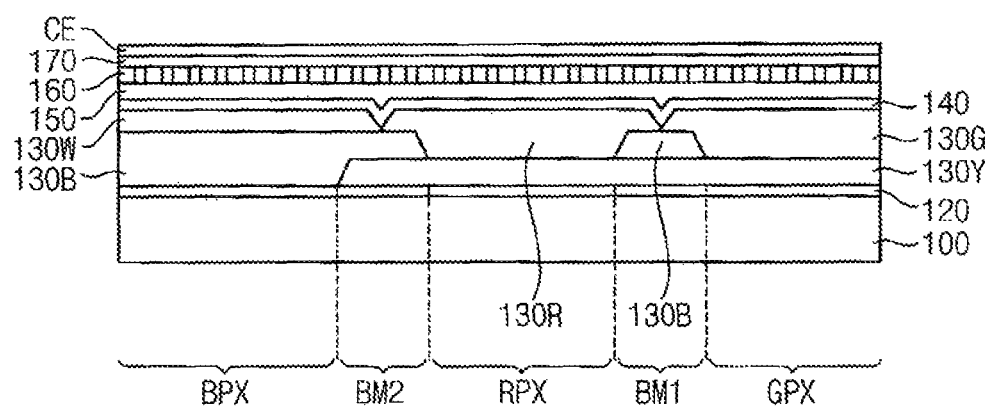

Referring to FIG. 10C, a red color conversion pattern 130R and a green color conversion pattern 130G may be formed on the blue light blocking pattern 130Y. A light recycle filter 140 may be formed on the blue color filter 130B, the red color conversion pattern 130R and the green color conversion pattern 130G. A planarization layer 150 may be formed on the light recycle filter 140. A wire grid polarizer 160, an insulation layer 170, and a common electrode CE may be sequentially formed on the planarization layer 150.

Figure 10D:
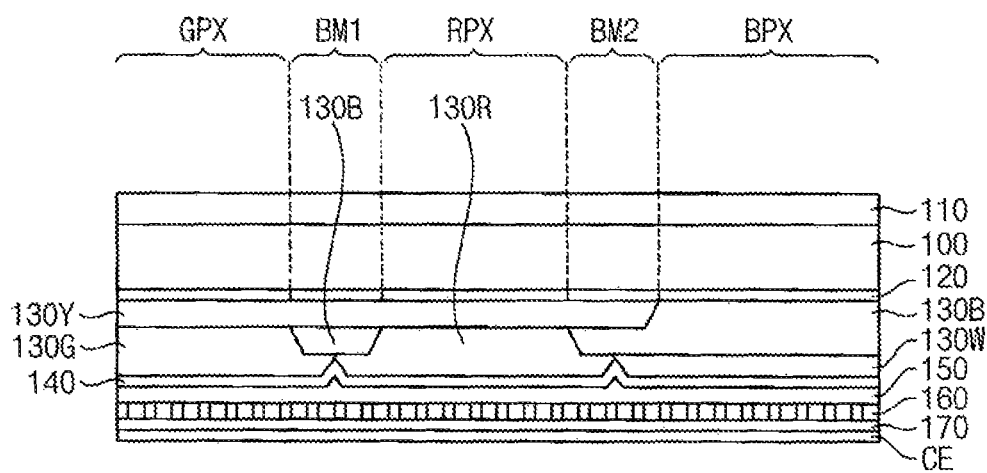

Referring to FIG. 10D, a ¼ wave polarizer 110 may be formed on the first base substrate 100. Accordingly, the photoluminescence device, which is an upper substrate of the display apparatus, may be formed. In addition, other configurations of the display apparatus can be manufactured by conventional general methods.

Figure 11A:
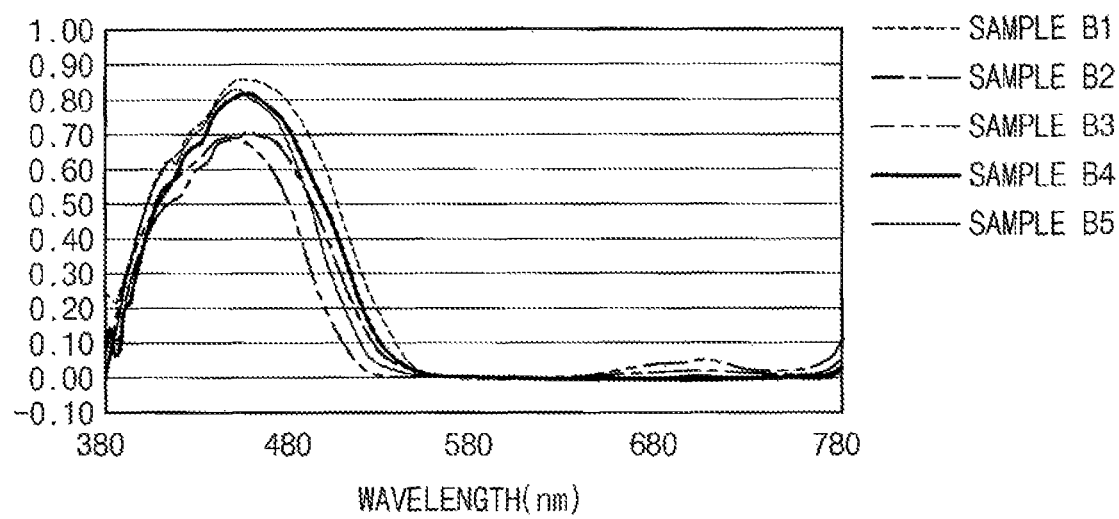
FIG. 11A is a graph of transmittance versus wavelength of a sample according to constituent material of a blue color filter of a display apparatus according to an example embodiment of the inventive concept.
Figure 11B:
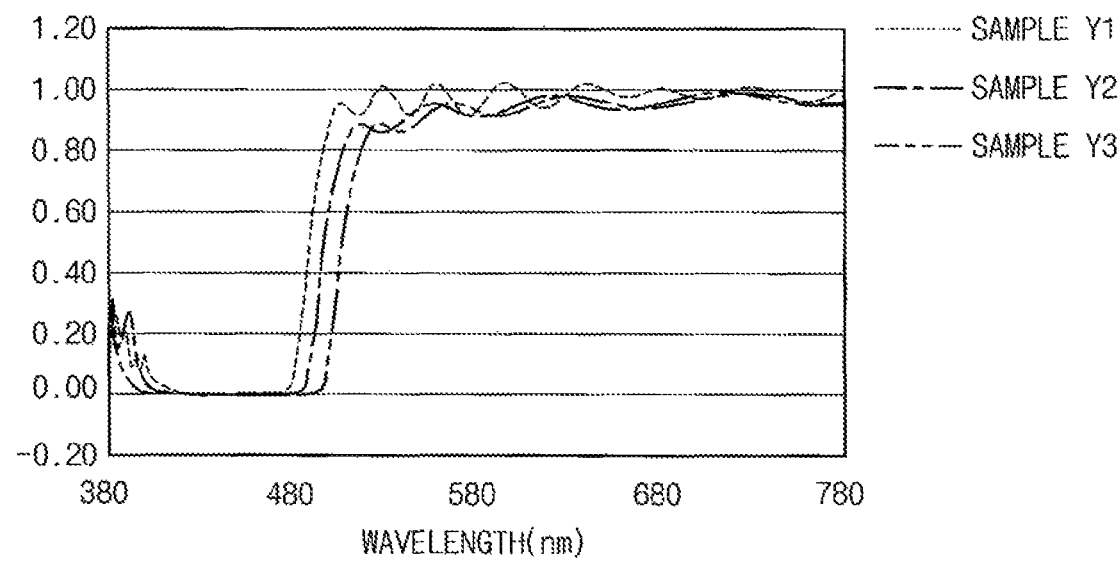
FIG. 11B is a graph of transmittance versus wavelength of a sample according to constituent material of a blue light blocking pattern of a display apparatus according to an example embodiment of the inventive concept.

FIG. 11A is a graph of transmittance versus wavelength of a sample according to constituent material of a blue color filter of a display apparatus according to an example embodiment of the inventive concept. FIG. 11B is a graph of transmittance versus wavelength of a sample according to constituent material of a blue light blocking pattern of a display apparatus according to an example embodiment of the inventive concept.

Referring to FIGS. 11A and 11B, the blue color filter of the display apparatus has a high transmittance for blue wavelength band and a low transmittance for wavelength band outside the blue wavelength band. FIG. 11A shows transmittance versus wavelength of several samples of the blue color filter according to the constituent material. The blue light blocking pattern may have a low transmittance for the blue wavelength band and a high transmittance for the wavelength band outside the blue wavelength band. FIG. 11B transmittance versus wavelength of several samples of the blue light blocking pattern according to the constituent material.

The blue color filter and the blue light blocking pattern overlap each other to have a low transmittance in an entire wavelength band. In some cases, light near a wavelength of 500 nm may be partially transmitted. Therefore, in the case of the blue color filter, the graph on the drawing is preferably shifted to the left, and in the case of the blue light blocking pattern, it is preferable that the graph is shifted to the right. For example, it can be seen that it is ideal to select the sample B3 of FIG. 11A and the sample Y3 of FIG. 11B.

In consideration of this, the constituent materials of the blue light blocking pattern and the blue color filter are properly selected, so that the blue light blocking pattern has a transmittance of 5% or less at a wavelength of 500 nm, and the blue color filter has a transmittance of 5% or less at a wavelength of 500 nm. Considering reduction of the transmittance in the transflective layer of the display apparatus and reduction of the transmittance of the ¼ wave polarizer, it was confirmed that optical density (OD) value in the first and second light-shielded regions finally became about 3 to 4. Thus, it can be seen that the blue light blocking pattern and the blue color filter can function as a light blocking pattern by overlapping.

According to example embodiments of the present inventive concept, a photoluminescence device includes a blue color filter and a blue light blocking pattern which are overlapped with each other in a first light blocking area and a second light blocking area. In addition, the photoluminescence device may further include a transflective layer and a ¼ wave polarizer. Accordingly, light blocking function can be realized without forming a additional light blocking member, such as a black matrix, by the blue color filter, the blue light blocking pattern, the transflective layer, and the quarter wave polarizing plate. Accordingly, the structure of a display apparatus including the photoluminescence device can be simplified and manufacturing process can be simplified.

In addition, the display apparatus can implement a light blocking function even when the blue color filter and the blue light blocking pattern are overlapped with each other in a peripheral area without an additional light blocking member such as a black matrix. In addition, it is possible to minimize detects in the process of forming the liquid crystal layer according to a step formed between the display area and the peripheral area.

The foregoing is illustrative of the inventive concept and is not to be construed as limiting thereof. Although a few example embodiments of the inventive concept have been described, those skilled in the art will readily appreciate that many modifications are possible in the example embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific example embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A photoluminescence device, comprising:
    a first base substrate;
    a blue light blocking pattern disposed on the first base substrate in a first color pixel area, a second color pixel area and a first light blocking area disposed between the first color pixel area and the second color pixel area;
    a blue color filter disposed on the first base substrate in a blue pixel area, the first light blocking area and a second light blocking area between the blue pixel area and the second color pixel area;
    a first color conversion pattern disposed on the blue light blocking pattern in the first color pixel area; and
    a second color conversion pattern disposed on the blue light blocking pattern in the second color pixel area, and
    wherein the blue light blocking pattern has a substantially same thickness throughout the first light blocking area as throughout at least one of the first color pixel area and the second color pixel area.

2. The photoluminescence device of claim 1, wherein the blue light blocking pattern has transmittance at a wavelength of 500 nm (nanometers) is less than 5%, and the blue color filter has transmittance at a wavelength of 500 nm is less than 5%.

3. The photoluminescence device of claim 1, wherein the first color conversion pattern is a green color conversion pattern, and the second color conversion pattern is a red color conversion pattern, or the first color conversion pattern is a red color conversion pattern, and the second color conversion pattern is a green color conversion pattern.

4. The photoluminescence device of claim 3, wherein the green color conversion pattern comprises green quantum dot particles and/or green phosphor, and
    the red color conversion pattern comprises red quantum dot particles and/or red phosphor.

5. The photoluminescence device of claim 1, further comprising:
    a transflective layer disposed between the first base substrate and the blue light blocking pattern, and between the first base substrate and the blue color filter; and
    a light recycle filter disposed on the blue color filter, the first color conversion pattern and the second color conversion pattern.

6. The photoluminescence device of claim 5, further comprising:
    a planarization layer disposed on the light recycle filter; and
    a wire grid polarizer disposed on the planarization layer.

7. The photoluminescence device of claim 6, further comprising:
    a ¼ wave polarizer disposed on the first base substrate.

8. The photoluminescence device of claim 1, further comprising:
    a transparent filter comprising scattering particles and disposed overlapping the blue color filter.

9. A display apparatus comprising a display area in which an image is displayed and a peripheral area which is non-display area and surrounding the display area, the display apparatus comprising:
    a first base substrate;
    a blue light blocking pattern disposed on the first base substrate in a first color pixel area, a second color pixel area and a first light blocking area disposed between the first color pixel area and the second color pixel area;
    a blue color filter disposed on the first base substrate in a blue pixel area, the first light blocking area and a second light blocking area between the blue pixel area and the second color pixel area;
    a first color conversion pattern disposed on the blue light blocking pattern in the first color pixel area; and
    a second color conversion pattern disposed on the blue light blocking pattern in the second color pixel area;
    a second base substrate facing the first base substrate;
    a thin film transistor disposed on the second base substrate;
    a pixel electrode electrically connected to the thin film transistor;
    a liquid crystal layer disposed on the pixel electrode; and
    a backlight unit providing a blue light to the liquid crystal layer and disposed under the second base substrate, and
    wherein the blue light blocking pattern has a same thickness throughout the first light blocking area as throughout at least one of the first color pixel area and the second color pixel area.

10. The display apparatus of claim 9, wherein the blue light blocking pattern has transmittance at a wavelength of 500 nm is less than 5%, and the blue color filter has transmittance at a wavelength of 500 nm is less than 5%.

11. The display apparatus of claim 9, wherein the first color conversion pattern is a green color conversion pattern, and the second color conversion pattern is a red color conversion pattern, or the first color conversion pattern is a red color conversion pattern, and the second color conversion pattern is a green color conversion pattern.

12. The display apparatus of claim 11, wherein the green color conversion pattern comprises green quantum dot particles and/or green phosphor, and the red color conversion pattern comprises red quantum dot particles and/or red phosphor.

13. The display apparatus of claim 9, further comprising:
a transflective layer disposed between the first base substrate and the blue light blocking pattern, and between the first base substrate and the blue color filter; and
a light recycle filter disposed on the blue color filter, the first color conversion pattern and the second color conversion pattern.

14. The display apparatus of claim 13, further comprising:
a planarization layer disposed on the light recycle filter; and
a wire grid polarizer disposed on the planarization layer.

15. The display apparatus of claim 9, wherein the blue light blocking pattern and the blue color filter are overlapped with each other in the first light blocking area and the second light blocking area.

16. The display apparatus of claim 9, further comprising:
a sealing member in the peripheral area, and
wherein the blue light blocking pattern and the blue color filter are overlapped with each other in the peripheral area.

17. A method of manufacturing a photoluminescence device, comprising:
forming a blue light blocking pattern on a first base substrate in a first color pixel area, a second color pixel area and a first light blocking area which is between the first color pixel area and the second color pixel area;
forming a blue color filter on the first base substrate in a blue pixel area, the first light blocking area and a second light blocking area which is between the blue pixel area and the second color pixel area;
forming a first color conversion pattern on the blue light blocking pattern in the first color pixel area; and
forming a second color conversion pattern on the blue light blocking pattern in the second color pixel area, and
wherein the blue light blocking pattern has a same thickness throughout the first light blocking area as throughout at least one of the first color pixel area and the second color pixel area.

18. The method of claim 17, wherein the blue light blocking pattern has transmittance at a wavelength of 500 nm is less than 5%, and the blue color filter has transmittance at a wavelength of 500 nm is less than 5%.

19. The method of claim 18, further comprising:
forming a transflective layer on the first base substrate before forming the blue light blocking pattern.

20. The method of claim 19, further comprising:
attaching a ¼ wave polarizer on the first base substrate.

* * * * *